April 2, 1957     G. W. JACKSON     2,787,475
LOAD CONTROLLED VALVE ASSEMBLY FOR VEHICLE AIR SPRING
Filed Aug. 30, 1955     3 Sheets-Sheet 1
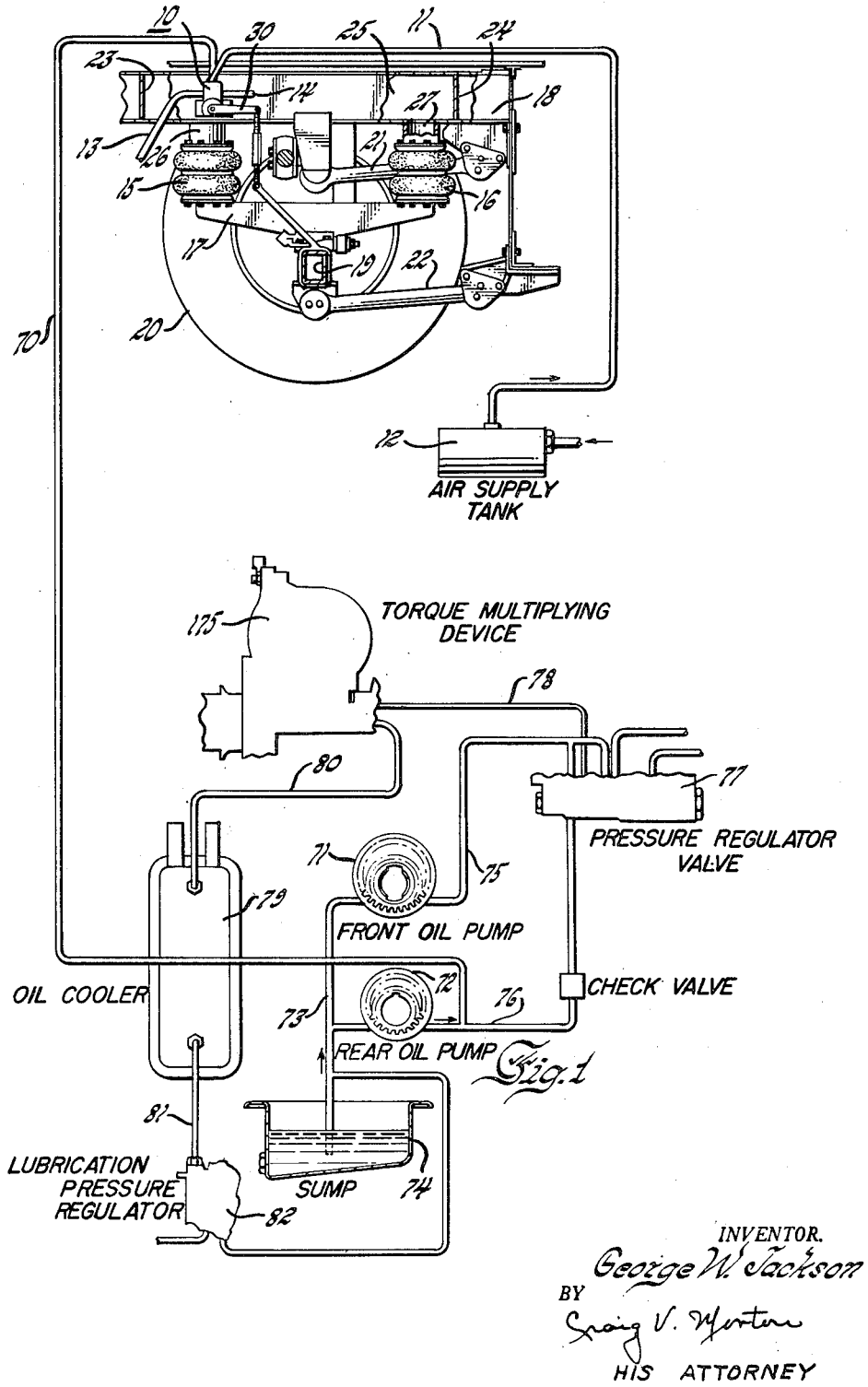

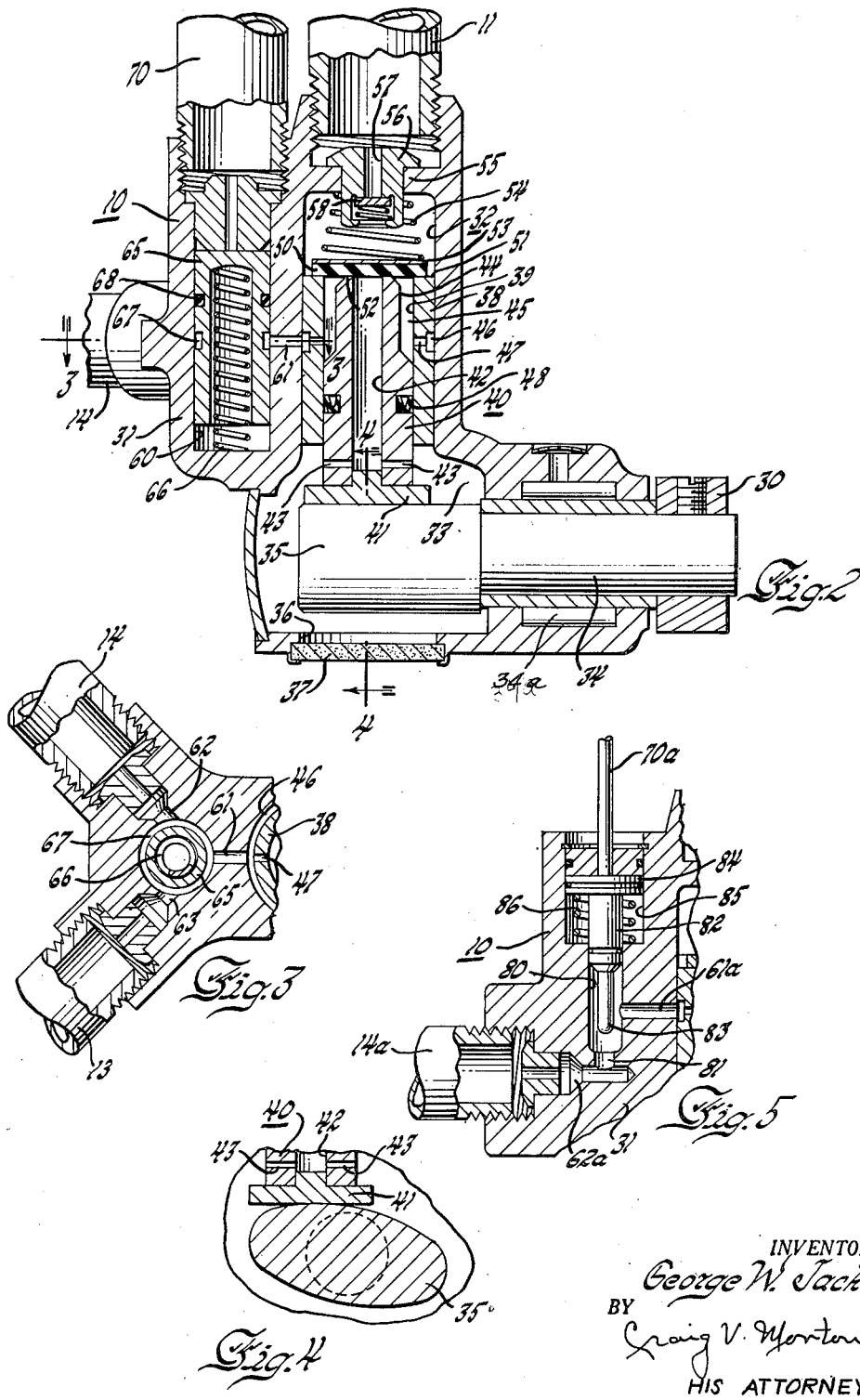

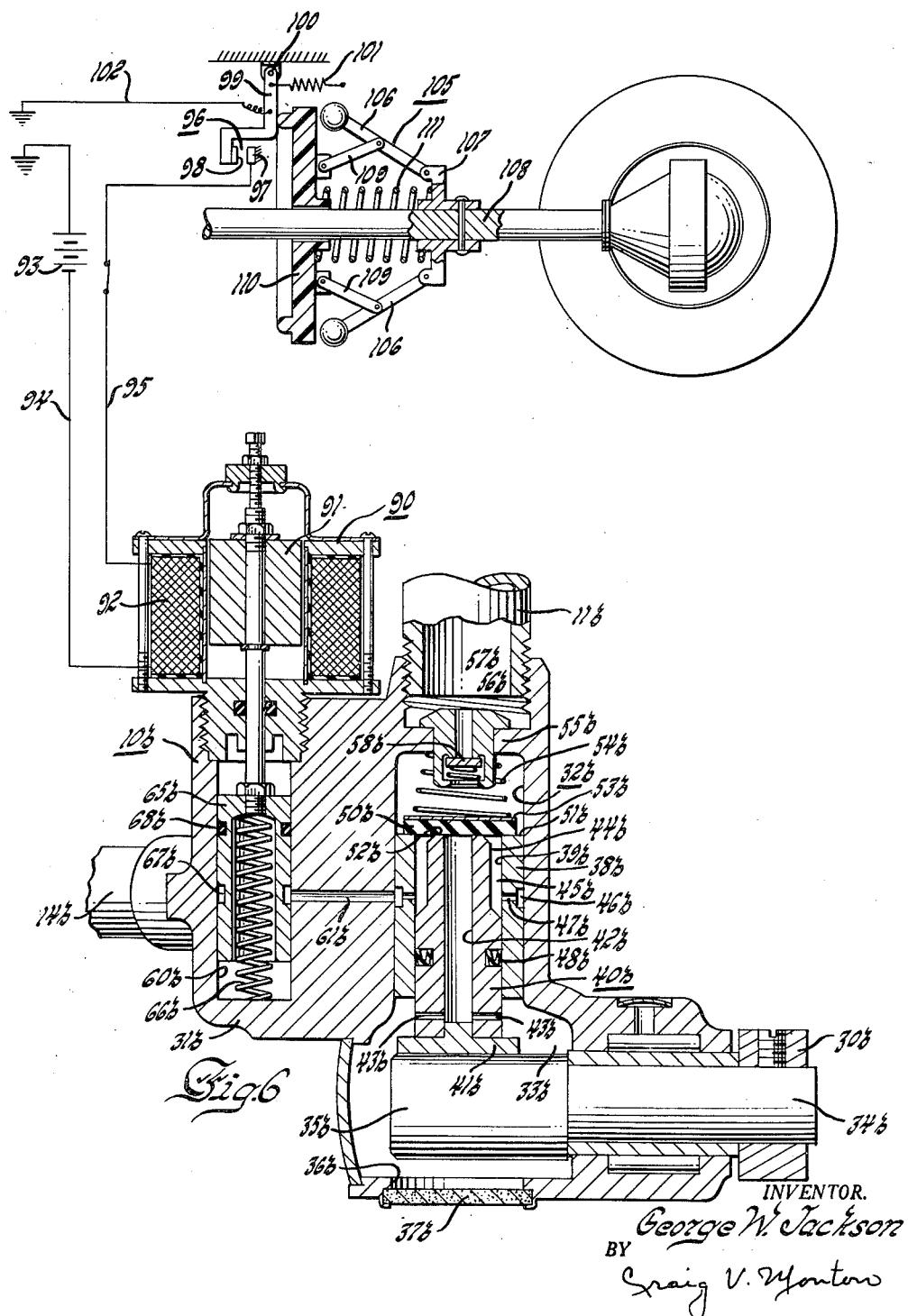

United States Patent Office 2,787,475
Patented Apr. 2, 1957

2,787,475

LOAD CONTROLLED VALVE ASSEMBLY FOR VEHICLE AIR SPRING

George W. Jackson, Dayton, Ohio, assignor to General Motors Corporation, Detroit, Mich., a corporation of Delaware Application August 30, 1955, Serial No. 531,374

1 Claim. (Cl. 280—124)

This invention relates to an improved control device for regulating the supply of air to and exhaust of air from a pneumatic suspension system for a motor vehicle.

The invention is particularly adapted for use in connection with a vehicle suspension system in which air springs provide the resilient means for supporting the body of the vehicle upon its running gear or axles. The air spring may be in the form of an air cushion, a bellows or a piston and cylinder inflated or charged with a volume of fluid, preferably air, under sufficient pressure to support the body of the vehicle above the axle.

The total movement between the body of a vehicle and the axle is limited due to various construction arrangements. Passenger vehicles are subject to wide load variations so that if the air springs are inflated with a fluid pressure value sufficient to maintain a predetermined clearance distance between the body and the axle of a vehicle under a relatively light load condition, the pressure in the air spring is insufficient to sustain a heavy load condition without the body of the vehicle striking the axle of the vehicle. Under a heavy load condition it is therefore necessary to increase the fluid pressure within the air spring to sustain the heavier load at a clearance distance from the axle of the vehicle the same as when the vehicle is carrying a light load.

To obtain full benefit from the use of comfortable riding air springs and to avoid "bottoming" on the axle, it is necessary to vary the degree of inflation of the air springs by increasing or decreasing the value of the fluid pressure in the air spring in response to load changes.

Obviously, if the fluid pressure in an air spring is low, that is of a value to properly support the body relative to the axle under a light load condition, then the body will move downwardly toward the axle when the load condition in the body increases. This relative movement between the body and the axle can be utilized to actuate fluid control valves to supply an increased fluid pressure to the air spring to return the body to its former predetermined height clearance between the body and the axle. As the load in the body decreases, the reverse condition will be created and the increased air pressure in the air spring can be exhausted to allow the body to move downwardly toward the axle to the predetermined height clearance.

It is therefore an object of this invention to provide an improved control apparatus for regulating the supply of air to an air spring and exhaust of air therefrom that includes mechanism operative in response to advancement of the vehicle to resist changes in air pressure in the air spring as soon as the vehicle begins movement over the road whereby the air spring maintains an established height condition between the sprung mass and the unsprung mass of the vehicle.

Another object of the invention is to provide a control mechanism for accomplishing the foregoing object wherein the control mechanism is free to supply air to an air spring or exhaust air from the air spring when the vehicle is stopped or in a parked condition, any load changes in the vehicle being corrected automatically by the control mechanism to establish a predetermined height clearance between the sprung mass and the unsprung mass of the vehicle, but wherein the control mechanism is rendered ineffective to cause any substantial change in the air pressure in the air spring promptly upon movement of the vehicle over the road, whereby the height clearance established while the vehicle was parked or stopped is thereafter maintained so long as the vehicle is in motion.

It is another object of the invention to provide a control mechanism in accordance with the foregoing objects wherein there is provided a control device that permits flow of fluid to and from individual air springs and allows for interchange of fluid between the individual air springs so long as the vehicle is stopped or in a parked condition, but wherein the control device is adapted to resist flow of fluid to or from the individual air springs and resist interflow of fluid between the air springs at any time the vehicle is in motion over the road.

Further objects and advantages of the present invention will be apparent from the following description, reference being had to the accompanying drawings wherein a preferred form of the invention is clearly shown.

In the drawings:

Figure 1 is a schematic view illustrating the use of a control mechanism of this invention in an air spring suspension system and including a schematic illustration of apparatus for effecting actuation of the control mechanism in response to movement of a vehicle.

Figure 2 is a cross sectional view of the control mechanism of this invention.

Figure 3 is a transverse cross sectional view taken along line 3—3 of Figure 2.

Figure 4 is a cross sectional view taken along line 4—4 of Figure 2.

Figure 5 is a cross sectional view of a modified arrangement of mechanism to resist flow of fluid to and from an air spring.

Figure 6 is a modified arrangement of the control mechanism of Figure 2 illustrating the device for electrical actuation.

The control mechanism illustrated in Figure 2 is adapted for use in an air spring suspension system such as that illustrated in Figure 1. The control mechanism 10 is adapted to receive air under pressure through a conduit 11 from a supply tank 12 that is maintained at a desired pressure level by any suitable air compressing system (not shown). Air from the line 11 is delivered through the lines 13 and 14 to air spring systems disposed at opposite sides of a motor vehicle, one of which systems is disclosed in Figure 1.

The air spring system disclosed in Figure 1 comprises a pair of expansible bellows type air springs 15 and 16 that are carried on opposite ends of a beam 17 and disposed between the beam 17 and the chassis frame 18 of the vehicle. The beam 17 is carried upon the axle 19 that in turn supports the vehicle wheels 20 at opposite ends of the axle. Torque rods 21 and 22 are provided to maintain stability of the suspension system.

The chassis frame 18 is provided with partitions 23 and 24 thereby forming a reservoir chamber 25 within the box frame of the chassis 18.

The control mechanism 10 is adapted to be mounted on a side wall of the chassis frame 18 with the conduit 14 supplying air into the reservoir 25 or exhausting air therefrom depending upon the operation of the control mechanism as hereinafter described. Each of the air springs 15 and 16 is connected with the reservoir chamber 25 through the connecting portions 26 and 27.

The conduit 13 from the control mechanism 10 connects with a similar air spring suspension system provided on the opposite side of the motor vehicle.

Assuming the spring suspension system illustrated in Figure 1 is merely supporting the load of the vehicle itself, the control mechanism 10 will be in a position in which air will neither be supplied to the reservoir 25 nor exhausted therefrom. When the load increases in the vehicle the chassis frame 18 tends to move toward the axle 19 thereby actuating the arm 30 of the control mechanism 10 in an upward direction to cause the control mechanism 10 to supply air under pressure from the line 11 into the reservoir 25 to increase the air pressure within the air springs 15 and 16, and thereby cause the chassis frame 18 to return to a predetermined height distance from the axle 19.

When the load within the vehicle lightens, the higher pressure within the air springs 15 and 16 will cause the chassis frame 18 to rise relative to the axle 19. This movement causes the arm 30 of the control mechanism 10 to move downwardly and dispose the control mechanism in a position to effect exhaust of air from the chamber 25 and thereby the air springs 15 and 16 until such time as the chassis frame 18 returns to its predetermined height distance relative to the axle 19.

The control mechanism 10, as disclosed in Figure 2, comprises a housing 31 having a valve chamber 32 that communicates with a chamber 33 that contains an oscillatable shaft 34 journaled in the bearing 34a secured in the housing 31.

The oscillatable shaft 34 carries on its outer end the actuating arm 30 that is operated by the change in height distance between the chassis frame 18 and the axle 19. The inner end of the oscillatable shaft 34 carries a cam member 35 disposed within the chamber 33. The chamber 33 is provided with an opening 36 closed by a porous plug 37 through which air can exhaust from the chamber 33 in a manner hereinafter described.

The valve chamber 32 supports a sleeve 38 having a bore 39. A reciprocable valve member 40 is slidable in the bore 39 of the sleeve 38, the lower end 41 of the member 40 engaging and riding upon the cam member 35 for reciprocation of the member 40 in the sleeve 38 upon oscillation of the shaft 34.

The reciprocable member 40 has an axial bore 42 that is open at the upper end thereof and has a plurality of radially disposed resistance orifice passages 43 that open into the exhaust chamber 33.

The upper end of the member 40 has a reduced diameter portion 44 thereby forming a chamber 45 between the portion 44 of the member 40 and the sleeve 38 that communicates with an annular groove 46 in the outer periphery of the sleeve 38 which communicates with the chamber 45 through a plurality of radially disposed passages 47. A seal member 48 is provided between the member 40 and the sleeve 38 to prevent loss of air from the chamber 45 to the exhaust chamber 33.

A disk valve 50 is positioned on the upper end of the sleeve 38 that forms a valve seat 51 for the disk valve 50. Also the upper end of the member 40 forms a valve seat 52 that is engaged by the disk valve 50. The disk valve 50 comprises a resilient rubber-like disk that is backed with a metal disk 53. A compression spring 54 is placed between the valve disk 53 and the upper end of the chamber 32 to cause the valve disk 50 to seat upon the valve seat 51.

The wall 55 of the chamber 32 is provided with a fitting 56 having a passage 57 through which fluid under pressure from the air pressure supply line 11 is delivered into the chamber 32, a check valve 58 being provided within the fitting 57 to prevent return flow of fluid.

The annular chamber 46 in the sleeve 38 is connected with a bore 60 disposed parallel with the valve chamber 32, a passage 61 connecting the chamber bore 60 with the annular chamber 46. The bore 60 is provided with fluid passages 62 and 63 that connect with the fluid lines 14 and 13 respectively for supplying fluid to and exhausting fluid from the air springs of the air spring system.

The chamber bore 60 contains a reciprocable member 65 held in the position illustrated in Fig. 2 by means of a compression spring 66. The member 65 thus forms a piston reciprocable in the bore 60. The outer periphery of the piston member 65 has an annular recess 67 adapted to align with the passage 61 when the member is in a normal inactive position illustrated in Fig. 2. An O ring seal 68 is provided on the piston member 65 for sealing against fluid loss between the bore 60 and the outer periphery of the member 65.

So long as the member 65 is in the position illustrated in Fig. 2 with the annular recess 67 aligned with the passage 61, the fluid passages 62 and 63 are in communication with the chamber 45 in the sleeve 38. Under this circumstance, when the valve disk 50 is lifted from its seat 51 by rotation of the shaft 34 in one direction, air under pressure will be supplied from the line 11 through the valve chamber 32 into the chamber 45 and thence through the passages 47 into the recess 46 and into the passage 61 into the recess 67 for distribution to the air spring systems through the fluid passages 62 and 63 into the distributing lines 13 and 14 respectively.

When the movable member 40 is moved downwardly, by rotation of the shaft 34 in an opposite direction, the axial passage 42 will be opened to the chamber 45 so that air within the air spring system can exhaust through the passages 62 and 63 back through the annular recess 67, passage 61, annular recess 46 and passage 47 into the chamber 45 and thence through the passage 42 and through the orifice passage 43 into the exhaust chamber 33 from which the air exhausts through the porous closure member 47.

Depending upon the direction of rotation of the shaft 34 it will thus be seen that air under pressure will be supplied to the air spring system or exhausted therefrom in the manner heretofore described so that any change in load in the vehicle effecting a height change between the chassis frame 18 and the axle 19 will be automatically compensated for by either increasing the air pressure in the air spring system or exhausting air from the system.

The foregoing action of the control mechanism disclosed in Fig. 2 will take place so long as the vehicle is parked. However, when the vehicle is moving over the road it is not desirable for operation of the valve mechanism to constantly supply air to the air springs and exhaust air from the air springs as would be occasioned by the constant movement of the axle 19 relative to the chassis frame 18. Therefore as soon as the vehicle begins advancement over the road, either forwardly or reversely, it is desirable to remove the effect of the air supply and exhaust control mechanism. This is accomplished by means of the reciprocable piston member 65 moving from its first and normal position illustrated in Figure 2 to a second position lower in the chamber bore 60 by which the annular recess 67 is no longer aligned with the passage 61. When this occurs the fluid passages 62 and 63 connected with the air springs through the lines 13 and 14 can no longer receive fluid under pressure from the passage 61 nor exhaust air from the air springs into the passage 61, whereby the air pressure within the air springs 15 and 16 will be retained at a constant value to support the load within the vehicle as corrected at the time the vehicle was in a standing condition.

The piston member 65 is actuated by means of fluid under pressure supplied through the conduit 70. This fluid is supplied only at the time the vehicle is in motion.

To supply fluid under pressure only while the vehicle is in motion, advantage is taken of the fact that it is common practice today to utilize automatic transmissions on motor vehicles, and such transmissions are provided with oil pumps some of which are driven by the engine shaft and others of which are driven by the propeller shaft of the vehicle so that they supply oil under pressure only when the car is in motion with the propeller shaft rotating.

For example, in Fig. 1 there is disclosed schematically an automatic transmission 175 for a vehicle which may be of the torque multiplying type, commonly known as a "Dynaflow" transmission. In this type of transmission there is provided an oil pump 71 known as a front oil pump driven by the engine shaft and which operates whenever the engine is operating. There is also provided a second oil pump 72 that is drivingly connected with the propeller shaft of the vehicle for operation only when the propeller shaft is rotated and the vehicle is in motion over the road. The pumps 71 and 72 obtain fluid through the line 73 from a sump 74, fluid under pressure being delivered through the discharge lines 75 and 76 to a pressure regulating valve 77 that in turn supplies fluid under pressure to other operating controls and through the line 78 supplies cooling fluid to the torque multiplying device 175. Cooling fluid is returned from the device 175 to an oil cooler 79 through a line 80, the oil cooler in turn being connected to the sump 74 by way of a line 81 and a lubrication pressure regulator 82.

As heretofore mentioned, the rear oil pump 72 is driven by the propeller shaft and therefore operates only when the vehicle is in motion. Thus the line 70 connecting with the piston chamber 60 of the control mechanism receives fluid under pressure only when the vehicle is in motion. Thus when the pump 72 delivers oil under pressure into the line 70 the piston member 65 will be moved downwardly against the compression spring 66 to move the annular recess 67 in the piston 65 out of alignment with the passage 61. This movement of the piston not only prevents air under pressure from being supplied or exhausted through the line 61, but since the fluid passages 62 and 63 also align with the annular recess 67 when it is in the position shown in Fig. 2, the interflow of fluid between the fluid lines 62 and 63 is cut off whenever fluid under pressure is delivered into the line 70 by the oil pump 72. Thus whenever the vehicle is in motion, interflow of air between the air spring systems supplied by the conduits 13 and 14 is resisted by the piston member 65.

In Figure 5 there is illustrated a modified arrangement of control device for resisting the supply and exhaust of air to and from the air spring systems and for resisting the interflow of fluid between the air spring systems. In Fig. 5 the passage 61a in the housing 31 of the control mechanism 10 through which air under pressure is supplied to the air spring systems and exhausted therefrom in the manner heretofore described communicates with a chamber 80. The chamber 80 has a port 81 extending from the bottom wall thereof that communicates with the fluid passage 62a that supplies fluid to one of the air spring systems through the conduit 14a in the same manner as heretofore described with reference to Figs. 1 and 2. Fluid under pressure can also be supplied to a second spring system in the same manner as that supplied through the passage 63 and the conduit 13 illustrated in Fig. 3.

The chamber 80 receives a reciprocable plunger 82 that has a metering pin 83 on the lower end thereof adapted to extend into the passage 81. The plunger 82 is carried on one end of a piston 84 that reciprocates in a cylinder bore 85, the piston 84 being normally retained in the position shown in Fig. 5 by means of a compression spring 86 to normally hold the metering pin 83 in the position shown in Fig. 5 and out of the passage 81. The cylinder 85 is connected by means of a conduit 70a with the high pressure discharge side of a rear oil pump of an automatic transmission as disclosed in Fig. 1 so that fluid under pressure is supplied into the cylinder 85 only when the vehicle is in motion and the oil pump is delivering oil under pressure. When this occurs the metering pin 83 will enter the passage 81 and restrict supply of air under pressure and exhaust of air from the line 14a and thus to the air spring system to prevent any rapid changes in the pressure of the air in the air springs 15 and 16.

This latter system is provided for the purpose of permitting a very small flow of air to and from the air springs 15 and 16 to take care of any possible leakage of air from the air springs over prolonged periods of road operation of the vehicle.

When the vehicle is in motion, and air supply to the air springs and exhaust of air from the air springs is resisted by the piston member 65 as disclosed in Fig. 2 or by the metering pin 83 as disclosed in Fig. 5 the constant oscillation of the shaft 34 will lift the disk valve 50 from its seat 51 and drop the seat 52 from the disk valve 50 thereby allowing a small volume of air to be bled through the valve.

In Figure 6 there is disclosed a modified arrangement for controlling the reciprocable piston member 65 of the device illustrated in Fig. 2. Since the control valve mechanism is primarily like that disclosed in Fig. 2, these parts of the device of Fig. 6 that are similar to the same parts of the device of Fig. 2 carry the same reference numeral but with the suffix "b." The difference between the devices illustrated in Figures 2 and 6 is that the device in Fig. 6 is provided with an electrically operated mechanism for rendering active the piston member 65b in response to movement of the vehicle.

The piston member 65b is connected with a solenoid actuating device 90 that is provided with a movable core 91 surrounded by an electric coil 92. When the coil 92 is energized the core 91 is drawn downwardly to thereby move the piston member 65b against the action of the compression spring 66b to disalign the annular recess 67b with the passage 61b.

The solenoid coil 92 is connected with a battery 93 by means of the lines 94 and 95 through a normally open control switch 96. The electric switch 96 comprises a stationary contact 97 and a movable contact 98 carried on an arm 99 that is pivotally mounted on the pivot pin 100 and is urged in a counter-clockwise direction by the tension spring 101. The movable arm 99 of the switch 96 is connected to ground by means of the wire 102.

The switch 96 is actuated by means of a speed sensitive mechanism 105 that consists of a pair of flyball weights 106 pivotally connected to a mounting ring 107 secured to a propeller shaft 108 of a vehicle and rotated only upon rotation of the propeller shaft. Links 109 connect the flyball weights 106 with a rotatable plate 110 that is also slidable axially on the propeller shaft 108 when the flyball weights 106 move outwardly as a result of rotation of the speed sensitive device 105. A compression spring 111 normally holds the speed sensitive mechanism in the position illustrated in Fig. 6 so that the plate 110 engages the arm 99 to retain the contacts 97 and 98 in open position and thereby effect deenergization of the solenoid coil 92 so that the spring 66b can position the piston member 65b with the annular recess 67b aligned with the passage 61b for flow of fluid to the air springs or exhaust of fluid therefrom.

Obviously, upon movement of the vehicle, resulting in rotation of the propeller shaft 108, rotation of the speed sensitive device 105 will effect movement of the plate 110 in a right hand direction to allow the contact 98 to engage contact 97 with the result that the solenoid coil is energized and the piston member 65b is moved downwardly to its second position.

While the form of embodiment of the invention as herein disclosed constitutes a preferred form, it is to be understood that other forms might be adopted as may come within the scope of the claim which follows.

What is claimed is as follows:

Control means in a motor vehicle employing an automatic transmission having a front oil pump driven with the engine and a rear oil pump driven by the propeller shaft of the vehicle whereby the rear oil pump operates only when the vehicle is in motion, the control means being adapted for regulation of the supply and exhaust of air pressure to and from an expansible air spring for the motor vehicle to maintain a regulated height between the sprung and the unsprung masses of the vehicle and including air pressure control means having passage means therein for conducting air pressure to and from an air spring and including valve means regulating air flow through the said passage means in either direction and further including operating means for the valve means adapted for actuation by relative movement between the sprung mass and the unsprung mass of a vehicle to effect regulated flow of air through said passage means in response to height changes between the sprung mass and the unsprung mass of a vehicle, and additional means in the said passage means having one position to permit air flow to and from the air spring and a second position to resist such flow actuated by oil pressure from the rear oil pump of the transmission whereby to dispose the said additional means in the said second position so long as the said rear oil pump delivers oil under pressure.

References Cited in the file of this patent

UNITED STATES PATENTS

| | | |
|---|---|---|
| 2,670,201 | Rossman | Feb. 23, 1954 |
| 2,687,311 | Nallinger | Aug. 24, 1954 |